United States Patent

[11] 3,598,962

| [72] | Inventors | William C. Badnaruk<br>Elverson;<br>Peter L. Helgeson, Macungie, both of, Pa. |
|---|---|---|
| [21] | Appl. No. | 888,546 |
| [22] | Filed | Dec. 29, 1969 |
| [45] | Patented | Aug. 10, 1971 |
| [73] | Assignee | Caloric Corporation<br>Topton, Pa. |

[54] RANGE WITH ELEVATED WARMING TRAY
8 Claims, 5 Drawing Figs.

[52] U.S. Cl. .................................. 219/444,
99/337, 219/403, 219/447, 219/465, 219/541
[51] Int. Cl. .................................. H05b 3/68
[50] Field of Search .................................. 219/444–
—447, 403—404, 479-8, 465, 541; 99/282, 337

[56] References Cited
UNITED STATES PATENTS

| 1,637,435 | 8/1927 | Brown | 219/404 |
|---|---|---|---|
| 2,109,006 | 2/1938 | Davis | 219/444 |
| 2,722,592 | 11/1955 | Pellegrin | 219/444 X |
| 2,738,411 | 3/1956 | Sandin | 219/444 |
| 2,850,613 | 9/1958 | McCormick | 219/444 |
| 2,850,614 | 9/1958 | Denlinger | 219/444 |
| 3,064,554 | 11/1962 | Lamb | 219/444 X |
| 3,146,338 | 8/1964 | Seremak | 219/403 |
| 3,334,215 | 8/1967 | Allen, Jr. | 219/404 |
| 2,931,873 | 5/1960 | Lang | 219/444 |

*Primary Examiner*—Volodymyr Y. Mayewsky
*Attorneys*—Harold A. Murphy and Joseph D. Pannone

ABSTRACT: A kitchen range having a cooking top and having thereabove a hinged shelf containing an electrical warming tray, and means for interconnecting the tray into an electrical circuit when the shelf and tray thereon are in lowered position.

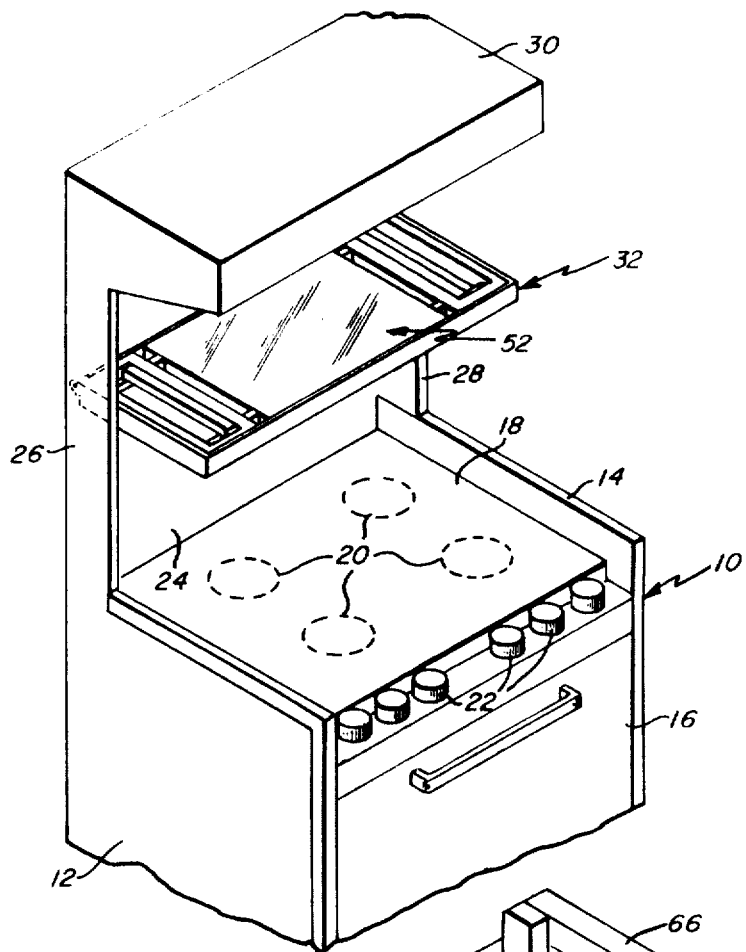
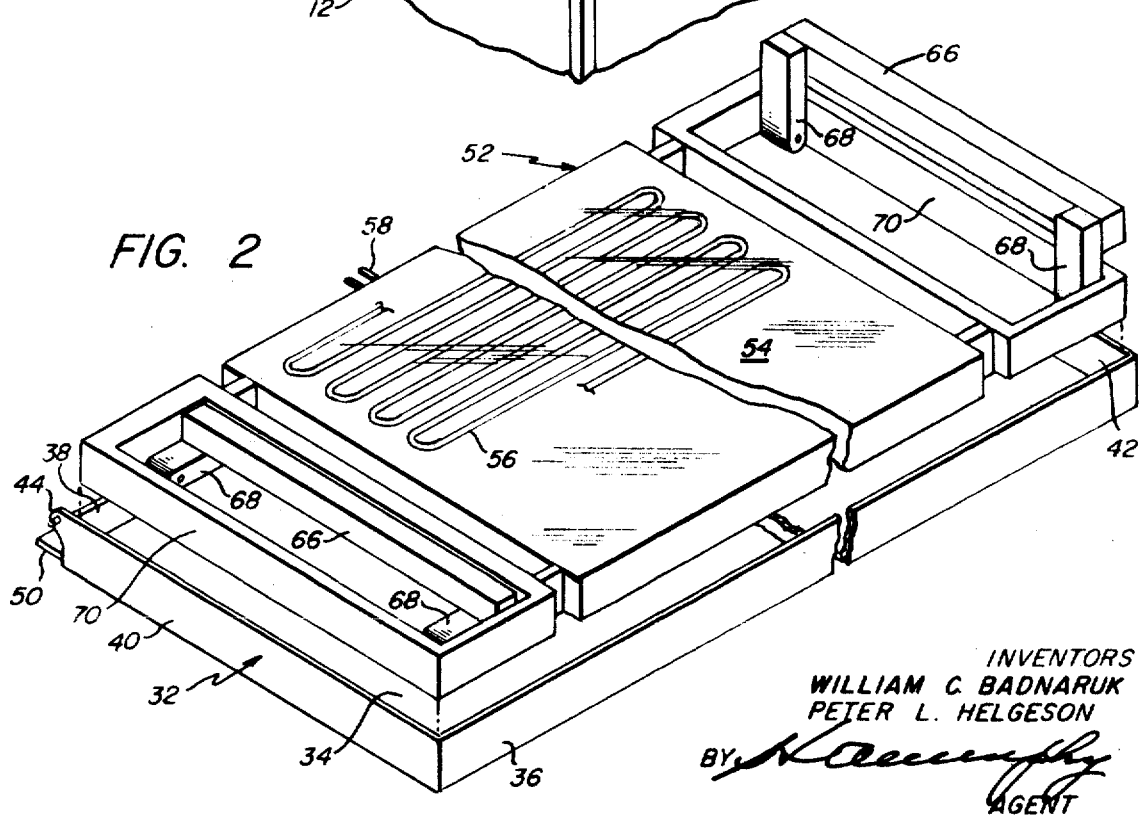

INVENTORS
WILLIAM C. BADNARUK
PETER L. HELGESON
BY
AGENT

RANGE WITH ELEVATED WARMING TRAY

BACKGROUND OF THE INVENTION

This invention relates to kitchen ranges and particularly to ranges having warming shelves or trays located above the cooking top.

The prior art is replete with examples of kitchen ranges with various means for keeping foods warm after they have been heated or cooked. One conventional way to do this is to place the heated food in the oven which may be located beneath or above the cooking top. Another method has been to place the heated food in a special container or on a tray which is supported upon and heated by one or more of the burners in the cooking top. A further method has been to provide the range with a slidable warming shelf which is disposed immediately above the cooking top and which includes an electric heating element within its structure.

However, in each of the known prior art types of warming apparatus, the heat therefore is generated by a fixedly mounted or attached part of the range. Therefore, when the food being warmed is removed from the range it immediately becomes subject to cooling.

SUMMARY OF THE INVENTION

In accordance with the present invention, the above and other disadvantages of the prior art are overcome by the provision of a range having a shelf pivotally mounted above and in substantial spaced relation with the cooking top, and an electrified warming tray supported by and movable with the shelf, the tray carrying thereon an electrical connection which is adapted to interconnect with a cooperating electrical connection on the range only when the shelf is lowered, and the tray and connection thereon being removable from the shelf to permit its transportation to remote location where it may be interconnected with another electrical connection independently of the range.

BRIEF DESCRIPTION OF THE DRAWINGS

The above and other objectives of this invention will become apparent from the following description taken in connection with the accompanying drawings, wherein:

FIG. 1 is a fragmentary isometric view of a kitchen range provided with one embodiment of this invention;

FIG. 2 is an enlarged view of the shelf and tray of the range shown in FIG. 1;

DESCRIPTION OF THE PREFERRED EMBODIMENT

Figures 3, 4, 5:
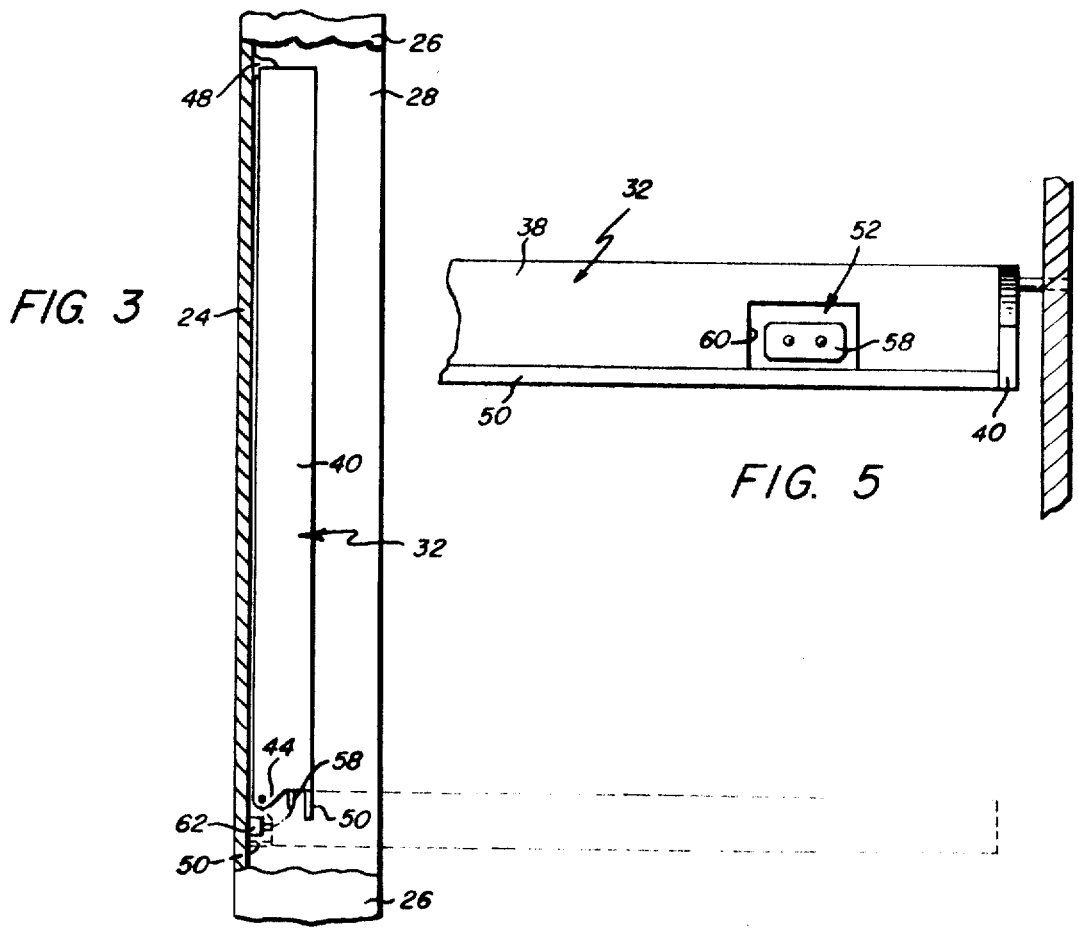
FIG. 3 is an enlarged sectional view illustrating one side of the shelf and showing its pivotal mounting on the range.
FIG. 4 is an enlarged sectional view of electrical interconnections on the range and tray.
FIG. 5 is a fragmentary rear view of a shelf showing an electrical connection on a tray therein.

Referring more particularly to the drawings wherein like characters of reference designate like parts throughout the several views, there is shown in FIG. 1 one form of kitchen range with which the present invention may be utilized. This range includes a base portion 10 having sides 12 and 14 between which is an oven area covered by an oven door 16 having above it a cooking top 18. The range may be of the electrical type or may be fueled by gas or other means, as desired, and includes a number of suitable burners 20 in the cooking top 18, as is well known, which are manually controlled by suitable knobs 22, which knobs 22 may include one or more thereof for controlling the operation of additional burners (not shown) within the oven. Additional details of the range cooking or baking areas are not provided herein since they do not constitute in themselves part of the present invention.

However, the range must be provided with a suitable upstanding backwall 24 and is preferably provided with shallow upstanding sidewalls 26 and 28 which extend upwardly a substantial distance above the cooking top 18 as shown in FIG. 1. The sidewalls 26 and 28 extend forwardly of the range for a short distance on either side of the cooking top 18 but only for a few inches or for such a distance as will not interfere with ready access to the back burners 20.

At the extreme top of the range there may or may not be provided a hood 30, or an upper oven (not shown), which hood or upper oven may be mounted on the upper end of the backwall 24 and sidewalls 26 and 28 by any suitable means whereby it will be spaced well above the cooking top 18.

In accordance with the present invention, a shelf 32 is mounted on the backwall 24 or sidewalls 26 and 28 and extends above the cooking top 18 and spaced therefrom at a suitable distance which will not interfere with the efficient handling of cooking utensils disposed on the burners 20. Shelf 32 comprises a bottom panel 34 and a front panel 36, FIG. 2, back panel 38, and side or end panels 40 and 42 projecting upwardly from the bottom panel 34 to form a box having an open top.

Sidewalls 40 and 42 each have a rearwardly projecting lug 44 carrying one end of a transversely extending pivot pin 46, the other end of which is pivotally mounted in a respective sidewall 26–28. Pivot pins 46 are made sufficiently rugged to support the shelf and any articles which may be mounted on it. When the shelf 32 is in raised position as shown by full lines in FIG. 3, it is retained in place by any suitable yieldable clamp such as a magnetic latch 48 or the like. When the shelf 32 is lowered to the position shown by dotted lines in FIG. 3, a projection 50 such as an extension of the bottom panel 34 is adapted to engage the upstanding backwall 24 of the range so as to prevent the shelf from being lowered below the horizontal.

Within the shelf is positioned a warming tray 52 the major portion of which comprises a layer 54 of relatively rigid thermally conductive material of any suitable type well known in the art which is adapted to be heated by or to transmit heat from electrical heating elements associated therewith. In one type of warming tray suitable for this purpose the heating elements are printed conductors 56 suitably laid onto the under surface of layer 54 and connected as a circuit to an electrical connector 58 which is carried in one side of the tray with its prongs extending through an aperture 60 provided therefor in the backwall 38 of the shelf 32.

The backwall 24 of the range carries a second electrical connector 62 which is of a type which cooperates with the connector 58 on the tray 52 whereby when the shelf is lowered to the position shown in dotted lines in FIG. 5 the prongs on connector 58 will engage with connector 62 in a manner such as shown in FIG. 4, for example. Connector 62 is connected to a suitable source of current as by wires 64 extending therefrom. When the shelf is lowered, therefore, the printed conductors 56 in the tray become heated in the normal manner of a warming tray.

The particular electrical connector structures and their mountings are illustrated in one exemplary form and it will be apparent that many electrical connectors may be utilized in the present invention and may be located in any suitable manner so that when the shelf is lowered the warming tray will become heated, but when the shelf is raised flow of current to the tray is prevented.

The tray 52, in accordance with this invention, is removable from the shelf so that it may be transported to a remote area for use and for interconnection with another circuit. For this purpose the tray 52 is provided with suitable handles 66 which may be hingedly mounted at each end of the tray as shown in FIG. 2. The handles 66 are preferably made of wood, plastic or other material which will not become unduly heated and have leg portions 68 which are pivoted to the inner sides of frame members 70 which are carried by the ends of the tray 52. When the tray 52 is located in the shelf 32, the handles 66 may be lowered into the frames 70 whereby the shelf will be allowed to be fully closed. When the tray is to be removed, it is merely necessary to raise the handles and, by them, lift the tray from the shelf.

From the foregoing it will be apparent that a novel warming means has been provided for kitchen ranges in accordance with the objectives of this invention. It will be apparent that various changes in the structures shown and described may be made by those skilled in the art without departing from the spirit of the appended claims. It is to be understood, therefore, that all matter shown and described is to be interpreted as illustrative and not in a limiting sense.

What we claim is:

1. In combination, a kitchen range having a wall, an elevated shelf hingedly mounted on said wall for movement between raised and lowered positions, warming means carried by said shelf and movable therewith and comprising a tray having an electrical resistance heating element, and a pair of cooperating electrical connectors, the first thereof being fixed to said wall and the second thereof being connected with said heating element, said first connector being positioned for operative engagement with the second connector only when the shelf is in lowered position.

2. The combination set forth in claim 1 wherein said shelf has a recessed surface which is uppermost when the shelf is in lowered position, and the warming tray is removably positioned within said recessed surface.

3. The combination set forth in claim 2 wherein said second connector is mounted in the edge of the tray which is directed toward said backwall when the shelf is in lowered position and is provided with electrical contacts which extend beyond the adjacent edge of the shelf and which engage said first connector only when the shelf is in lowered position.

4. A kitchen range comprising the combination of a cooking top, a backwall and sidewalls extending above the cooking top, an elevated shelf hingedly mounted on said walls for movement between a raised-closed position parallel with and adjacent said backwall and a lowered open horizontal position, a warming tray removably positioned on said shelf and movable therewith and comprising an electrical resistance heating element, and a pair of cooperating electrical connectors one of which is fixed to one of said walls, and the second thereof being connected with said heating element.

5. A kitchen range as set forth in claim 4 wherein said first connector is positioned for operative engagement with the second connector only when the shelf is in lowered position.

6. A kitchen range as set forth in claim 4 wherein said shelf has a recessed surface which is uppermost when the shelf is in lowered position, and the warming tray is removably positioned within said recessed surface.

7. A kitchen range as set forth in claim 6 wherein said second connector is mounted in the edge of the tray which is directed toward said backwall when the shelf is in lowered position and is provided with electrical contacts which extend beyond the adjacent edge of the shelf and which engage said first connector only when the shelf is in lowered position.

8. A kitchen range as set forth in claim 4 wherein said shelf is hingedly connected at each end to a respective one of said sidewalls, and means extends from the rear edge of the shelf when in open position for engagement with said backwall for retaining the shelf in a horizontal position when open.